United States Patent
Bhatia et al.

(10) Patent No.: US 9,841,290 B1
(45) Date of Patent: Dec. 12, 2017

(54) SYSTEM, METHOD, AND COMPUTER PROGRAM FOR MAINTAINING SERVICE CONTINUITY ASSOCIATED WITH A MOBILE DEVICE DURING TRAVEL

(71) Applicant: Amdocs Development Limited, Limassol (CY)

(72) Inventors: Sanjay Bhatia, Pune (IN); Gabriel Podolsky, Nesher (IL)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/135,484

(22) Filed: Apr. 21, 2016

Related U.S. Application Data

(60) Provisional application No. 62/155,410, filed on Apr. 30, 2015.

(51) Int. Cl.

| | |
|---|---|
| *G01C 21/20* | (2006.01) |
| *G01C 21/26* | (2006.01) |
| *G01C 21/34* | (2006.01) |
| *H04W 4/04* | (2009.01) |
| *H04W 24/04* | (2009.01) |
| *H04W 4/02* | (2009.01) |
| *G01C 21/36* | (2006.01) |

(52) U.S. Cl.
CPC ..... *G01C 21/3461* (2013.01); *G01C 21/3697* (2013.01); *H04W 4/02* (2013.01); *H04W 24/04* (2013.01)

(58) Field of Classification Search
CPC . G01C 21/3461; G01C 21/3697; H04W 4/02; H04W 24/04; G08G 1/096827; G08G 1/096844; G08G 1/096833; G08G 1/096883
See application file for complete search history.

(56) References Cited

U.S. PATENT DOCUMENTS

| | | | |
|---|---|---|---|
| 7,609,678 B2 | 10/2009 | Sharma et al. | |
| 8,311,841 B2* | 11/2012 | Miyasaka | G10L 19/18 704/500 |
| 9,057,620 B2* | 6/2015 | Dave | G01C 21/3461 |
| 9,277,431 B1 | 3/2016 | Podolsky | |

(Continued)

OTHER PUBLICATIONS

U.S. Appl. No. 14/267,832, filed May 1, 2014.

*Primary Examiner* — Michael J Zanelli
(74) *Attorney, Agent, or Firm* — Zilka-Kotab, PC

(57) ABSTRACT

A system, method, and computer program product are provided for maintaining service continuity associated with a mobile device during travel, by providing alternative navigational routes based on user defined inputs and preferences. In use, at least one input parameter is received from a mobile device associated with at least one communication network, the at least one input parameter corresponding to a navigational task to be performed utilizing the mobile device. Further, a starting point associated with the navigational task is identified. Additionally, an ending point associated with the navigational task is identified. Furthermore, at least one route is determined from the starting point to the ending point, based at least in part on a current service continuity associated with the mobile device, a historical service continuity associated with the mobile device, and the at least one input parameter.

20 Claims, 4 Drawing Sheets

(56) References Cited

U.S. PATENT DOCUMENTS

| | | | |
|---|---|---|---|
| 2012/0220290 A1* | 8/2012 | Awad | H04M 3/2227 455/423 |
| 2013/0024107 A1* | 1/2013 | Xie | G01C 21/3461 701/423 |
| 2014/0067257 A1* | 3/2014 | Dave | G01C 21/3461 701/423 |
| 2014/0257695 A1* | 9/2014 | Annapureddy | G01C 21/00 701/537 |
| 2016/0252350 A1* | 9/2016 | Wharton | H04W 4/02 701/25 |

* cited by examiner

SYSTEM, METHOD, AND COMPUTER PROGRAM FOR MAINTAINING SERVICE CONTINUITY ASSOCIATED WITH A MOBILE DEVICE DURING TRAVEL

CLAIM OF PRIORITY

This application claims the benefit of U.S. Provisional Application No. 62/155,410, filed Apr. 30, 2015, the entire contents of which are incorporated herein by reference.

FIELD OF THE INVENTION

The present invention relates to maintaining telecommunication service continuity of mobile devices during travel by suggesting the optimal route of desired level of service based on user defined inputs and preferences.

BACKGROUND

During travel, continuous connectivity and desired telecommunication services are needed for many business and personal situations. During travel, various disruptions may occur due to network congestions, coverage, weak signals, no signals, availability of service, service disruptions, and/or various other reasons. These disruptions may lead to reconnect issues, loss of continuity in communication, customer frustration, and poor customer experience and satisfaction.

There is thus a need for addressing these and/or other issues associated with the prior art.

SUMMARY

A system, method, and computer program product are provided for maintaining service continuity associated with a mobile device during travel, by providing alternative navigational routes based on user defined inputs and preferences. In use, at least one input parameter is received from a mobile device associated with at least one communication network, the at least one input parameter corresponding to a navigational task to be performed utilizing the mobile device. Further, a starting point associated with the navigational task is identified. Additionally, an ending point associated with the navigational task is identified. Furthermore, at least one route is determined from the starting point to the ending point, based at least in part on a current service continuity associated with the mobile device, a historical service continuity associated with the mobile device, and the at least one input parameter, the current service continuity being determined utilizing current radio frequency (RF) network health information and current probe-based key performance indicator (KPI) information and the historical service continuity being determined utilizing historical RF network health information and historical probe-based KPI information. In addition, the at least one route is presented as at least one route option associated with the navigational task utilizing the mobile device. Further, additional current service continuity information associated with the mobile device is received. Still yet, at least one alternative route to the at least one route is identified based on the additional current service continuity information associated with the mobile device. Moreover, an indication of the at least one alternative route is presented utilizing the mobile device. On-route alerts and re-routing are also provided based on network condition during the travel.

DETAILED DESCRIPTION

Figure 1:
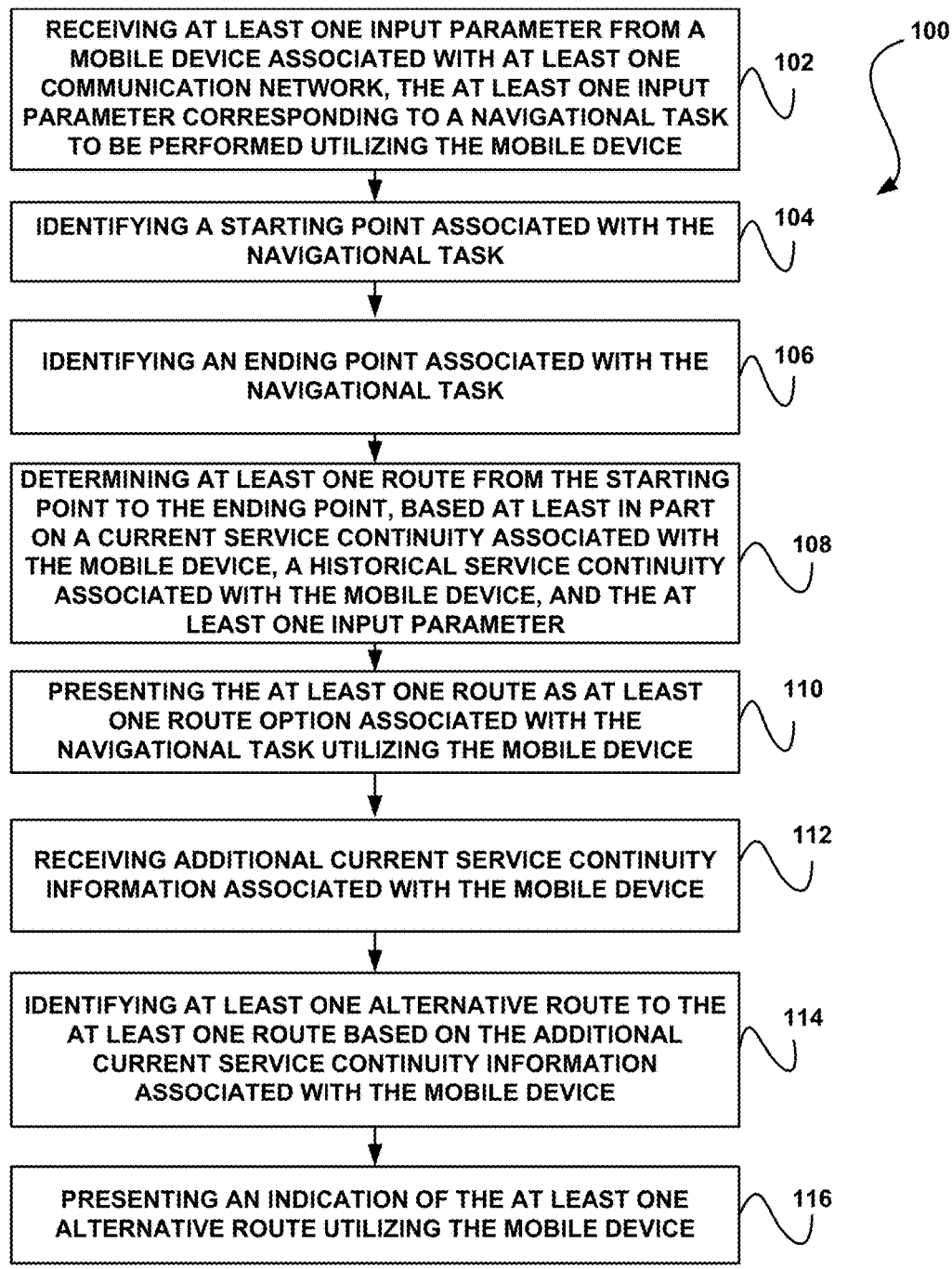
FIG. 1 illustrates a method for maintaining service continuity associated with a mobile device during travel, in accordance with one embodiment.

FIG. 1 illustrates a method 100 for maintaining service continuity associated with a mobile device during travel, in accordance with one embodiment.

As shown, at least one input parameter is received from a mobile device associated with at least one communication network. See operation 102. The at least one input parameter corresponds to a navigational task to be performed utilizing the mobile device.

The mobile device may include any device capable of being utilized to perform at least a portion of a navigational task. For example, the mobile device associated with the communications network may include a mobile phone, a handheld navigational unit, a vehicle navigation unit, a watch, a computer, and/or various other devices.

Additionally, the navigational task may include any task associated with generating a route from a first point to one or more second points. For example, the navigational task may be associated with a vehicle navigation, a walking navigation, a biking navigation, a boating navigation, a public transit navigation, and any other form of navigation or combination thereof. In one embodiment, a user of the mobile device may initiate the navigation task by requesting directions to a location (e.g. utilizing an application on the mobile device, etc.).

As shown further in FIG. 1, a starting point associated with the navigational task is identified. See operation 104. Additionally, an ending point associated with the navigational task is identified. See operation 106.

In one embodiment, the at least one input parameter may include the starting point and/or the ending point. For example, the user may input the starting/ending point into an application utilizing the mobile device. In one embodiment, the starting point may include a current location of the user/mobile device. In this case, the method 100 may include determining the current location of the mobile device.

Of course, the input parameters may include various parameters, which may be input by the user, determined automatically, or input from another application and/or system, etc. For example, the input parameters may include a requested service type. In this case, the requested service type may include one or more of a voice service, a data service, and/or a messaging service. In various embodiments, the service type may be determined automatically and/or may be indicated by the user or a communication service provider associated with the communication network, etc.

As another example, the input parameter may include a desired interim stop between the starting point and the ending point. For example, the user may indicate a location in which the user would like to stop during the travel. In this case, the desired interim stop may be considered when determining a route.

As another example, the input parameter may include an indication of at least one mode of transport. The mode of transport may include any mode of transport, such as walking, biking, vehicle (e.g. car, etc.) travel, public transit, boating, and/or any other mode of transport. In various embodiments, the mode of transport may be determined automatically (e.g. utilizing an application associated with the mobile device, etc.) or input (e.g. selected, etc.) by the user.

As another example, the input parameters may include a map or navigational input from at least one application associated with the mobile device or another device. In this case, the map or navigation input may be input manually or automatically. The map or navigation input may include any information from a map based application, such as points of interest, businesses, addresses, routes, traffic information, construction information, detour information, and/or various other information.

In various other embodiments, the input parameters may include network preferences, key performance indicators (KPIs) corresponding to the communication network, Wi-Fi offloading location options/information, subscriber information and network experience preference information, and/or various other data. Moreover, the input parameters may include many input parameters, which may be from different sources.

With further reference to FIG. 1, at least one route is determined from the starting point to the ending point, based at least in part on a current service continuity associated with the mobile device, a historical service continuity associated with the mobile device, and the at least one input parameter. See operation 108. The current service continuity is determined utilizing current radio frequency (RF) network health information and current probe-based key performance indicator (KPI) information and the historical service continuity is determined utilizing historical RF network health information and historical probe-based KPI information.

The service continuity may be determined based on any service information corresponding to prospective routes. This information may be based on current service information (e.g. associated with other users, network statistics, etc.) and/or historical information (e.g. associated with other users, network statistics, the current user, etc.).

In addition, the at least one route is presented as at least one route option associated with the navigational task utilizing the mobile device. See operation 110. In this case, presenting the at least one route as the at least one route option associated with the navigational task utilizing the mobile device may include suggesting an initial best route based on the service continuity associated with the mobile device.

In various embodiments, the routes may be presented in map format or text format. Further, one route option may be presented or multiple route options may be presented. In one embodiment, the route options may be presented in an order based on preference (e.g. based on service continuity and/or input parameters, etc.).

In one embodiment, a route selection may be received from the user. In this case, the method 100 may include displaying a route based on the selection.

Further, additional current service continuity information associated with the mobile device is received. See operation 112. The additional current service continuity information may include real-time information associated with the service. The current information may be received from the mobile device, other mobiles devices, the communication network associated with the mobile device, and/or other communication networks.

Still yet, at least one alternative route to the at least one route is identified based on the additional current service continuity information associated with the mobile device. See operation 114. In this case, identifying the alternative routes to the at least one route based on the current service continuity information associated with the mobile device includes identifying the alternative routes based on real-time analytics. The real-time analytics may include radio frequency (RF) network health index information, probe-based key performance indicators (KPIs), service level requirements, and/or any other mobile network based information. The alternative routes may include routes that are determined to be better routes than the current route.

As an example, in one embodiment, the input parameter may be associated with at least one service level requirement, such that determining the route from the starting point to the ending point based on the service continuity associated with the mobile device and the at least one input parameter network includes determining whether the service level requirement can be met on a particular route, given key performance indicator information corresponding to the at least one communication network. In this case, the KPI information may be obtained utilizing network probe measurements. As a specific example, a customer may need low delay for a video conference and thus may need to check if the network can provide the low delay based on the probe measurements.

Moreover, an indication of the at least one alternative route is presented utilizing the mobile device. See operation 116. In various embodiments, the indication of the alternative route may be presented as an alert, a route on a map, a text notification, and any other indication that an alternative route is present. In any case, the alternative route may include a route that is determined to be a better alternative than the current route.

In one embodiment, the method 100 may further include providing alerts based on a current route and/or the service continuity. For example, alerts may be provided for disruptions in the connectivity or the service continuity of the mobile device. As another example, alerts may be provided for anticipated disruptions in the connectivity or the service continuity of the mobile device based on a current route associated with the mobile device. In this case, data from other users and/or network statistics may be used to predict and/or anticipate disruptions.

The method 100 may be implemented to address issues associated with reconnect issues, loss of continuity in communication that lead to loss of time/resources, frustration, poor experience and satisfaction. By using the method 100, service providers can provide route planning aids with assured connectivity and service continuity, while their subscribers are mobile, for various service types, desired quality of service (QoS), and also provide service alternatives, data points to take informed decision and during on-route, real-time re-routing updates and appropriate alerts in-case of temporary network availability or disruptions.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
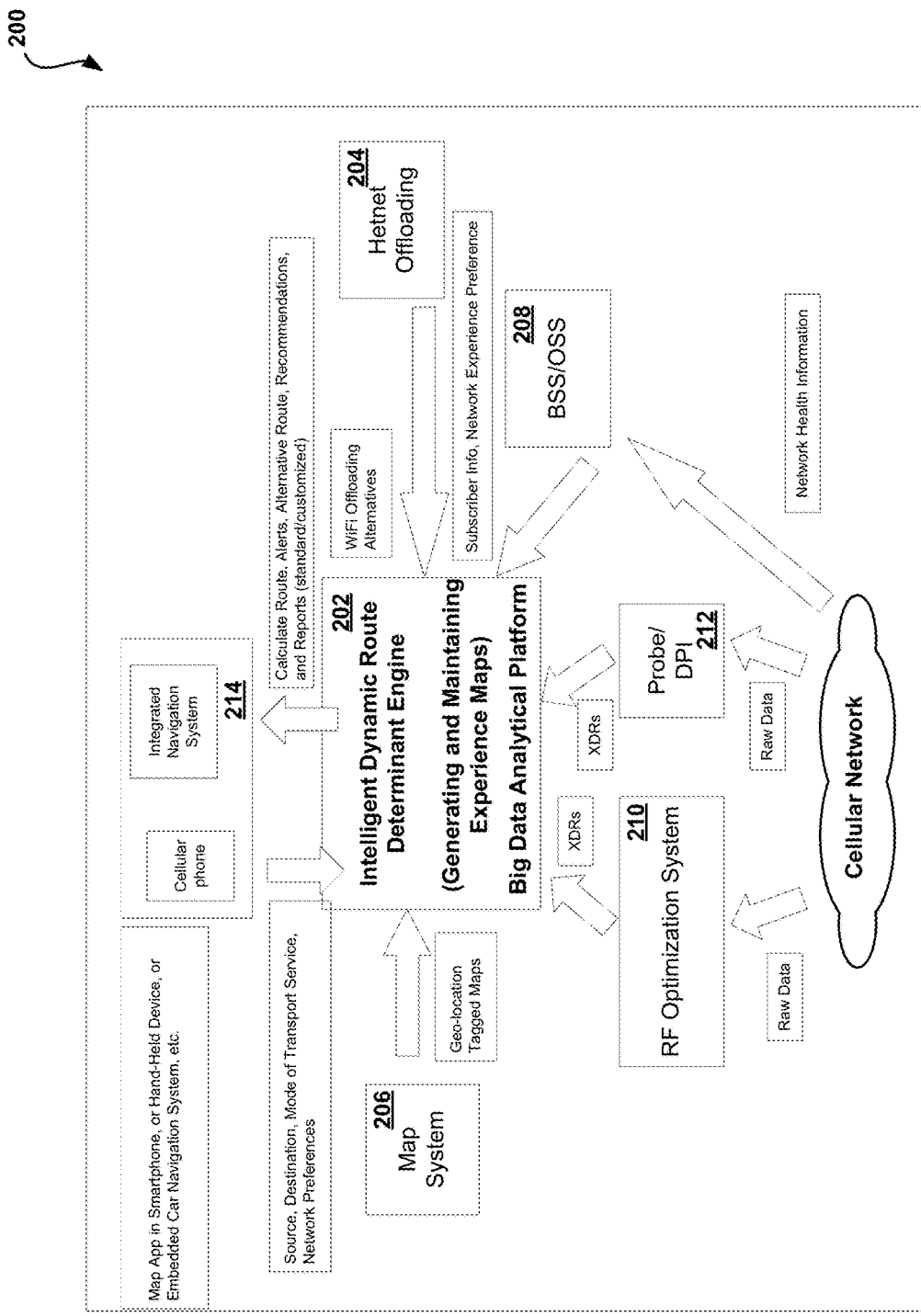
FIG. 2 illustrates a system for maintaining service continuity associated with a mobile device during travel, in accordance with one embodiment.

FIG. 2 illustrates a system 200 for maintaining service continuity associated with a mobile device during travel, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, the system 200 includes an intelligent dynamic route determinant engine 202 capable of receiving input from various systems/applications, such as a map system 206, a Hetnet offloading system 204, a BSS/OSS 208, an RF optimization system 210, a probe/DPI 212, and/or at least one mobile device 214. In various embodiments, the intelligent dynamic route determinant engine 202 may be cloud-based and/or part of one or more of the mobile devices 214.

During travel any mode of transport, or combination of modes of transport, going from one point to another the mobile subscribers, require non-interruptive, continuous, seamless connectivity of various telecom services (e.g. voice, data, SMS, video, etc.), due to sensitivity and criticality of the business or personal situation.

For example, a user may have an important business call while travelling on a car (e.g. during a daily routine, etc.). As another example, a user may be attending a video conference while travelling abroad and the user may not be sure about what route to take or whether to stay in a current location to attend the conference. As another example, a user may be deciding which route to take while planning long travel to assure that on a particular day or time the user may has the ability to attend a personal/business call. As another example, a user may desire to watch an important entertainment program, sports match, or live telecast during a trip. Further, the user may want a route that provides uninterrupted on-call support while travelling.

Various network/technical/availability issues of coverage, connectivity, and signal strength lead to voice or data connection failure, causing disruption. In these situations, the subscribers require information on the possible routes they may take during the travel for a non-interruptive session. Subscribers today do not have any techniques to determine this information before-hand.

During day to day usage on known paths of business/personal travel (e.g. office to home, home to another usual place of travel, etc.), the subscribers accumulate experience and, in situations of criticality, may avoid or alter their routes. However, during travel on a new route/city/destination, lack of such information may lead to frustrating disconnects and loss of time. There are various situations where the subscriber would like to know, in advance before the travel, a particular service type and bandwidth availability (e.g. 2G, 3G, Wi-Fi-Offloading option, and on-route real-time dynamic information updates, etc.). The user may also want to receive alerts during the journey in case of temporary disruptions or uptime/down-time of a particular service.

Some navigation assist devices/maps provide information on the various alternative routes based on the preferences of the subscribers, when they desire to travel different points. However, to date, such devices do not provide information on network coverage, network service availability or strength on these routes.

The method and system 200 include a new technique for telecommunication service providers to provide a service, including the intelligent dynamic route determinant engine 202, where their subscriber can input their choice of origin/destination, mode of transport, type of service, and various other parameters, and an application associated with the system (e.g. the intelligent dynamic route determinant engine 202, etc.) may provide various alternative routes and informed data points for seamless connectivity and service usage. Additionally, the service may provide device assured connectivity, an alternative option for continuity of service usage, on-route real-time rerouting updates and alerts in case of status changes of network/service availability.

In one embodiment, the system 200 may provide a desktop/mobile network mapping service offering a best route planning aid or decision support system to the subscriber based on their origin and destination and various options of service choice during the trip for uninterrupted service usage. Additionally, in one embodiment, the system 200 may work as a complement to existing navigation systems/aids by upgrading them with a supplementary service of providing optimized uninterrupted telecom service usage continuity route/pathway suggestions and dynamic alerts based on criteria (e.g., desired service, networks, QoS, etc.).

In operation, in one embodiment, the system 200 may implement intelligent route calculation based on a subscriber network experience index for the different network areas in the route, using current and historic patterns. Additionally, the system 200 may implement intelligent route calculation based on a network health index, for the network areas, using current measurements and historic patterns. More information regarding intelligent route calculation based on a subscriber network experience index, and the network health index, may be found in U.S. patent application Ser. No. 14/267,832, titled "System, Method, And Computer Program For Generating Mobile Subscriber Network Experience Indicators Based On Geo-Located Events", filed May 1, 2014, which is incorporated herein by reference in its entirety.

In operation, in one embodiment, the system 200 may update routes in real-time from network measurements, during the travel time, allowing changes to the route in real-time upon changes in network quality conditions. Additionally, in one embodiment, the system 200 may take into account Wi-Fi offloading alternatives for intermediate stops.

The intelligent dynamic route determinant engine 202 may perform intelligent route calculation by taking into account parameters such as a requested service type (e.g. voice, data, SMS, etc.). Additionally, the intelligent dynamic route determinant engine 202 may consider specific constraints of bandwidth and QoS requirements for the service types, according to the customer QoS subscription (e.g. Gold, Silver, Bronze, etc.), as these subscription parameters are typically registered in the BSS. The intelligent dynamic route determinant engine 202 may also consider specific constraints per requested application the subscriber intends to use along the route (e.g. video calls, high quality video conference, email, etc.).

The intelligent dynamic route determinant engine 202 may also consider and/or utilize inputs from external sources, such as various applications and/or navigation systems.

The intelligent dynamic route determinant engine 202 may also receive input from a subscriber. Such information may include a source, a destination, stops, a mode of transportation, service information, and/or network preferences, etc. Other information may include network/service coverage, strength, connectivity, speed test maps, congestion, coverage holes, comparison of various service providers, and QoS information, etc.

In various embodiments, these inputs may be taken as input through a map application in a smartphone, or handheld device, or an embedded car navigation system, etc.

There may be various interfaces to the intelligent dynamic route determinant engine 202 at the backend, such that the intelligent dynamic route determinant engine 202 provides a calculated route, alerts, alternative routes, and recommendations.

In one embodiment, the intelligent dynamic route determinant engine 202 may be based on a Big Data Analytics platform, and may incorporate one or more route determinant algorithms. The input parameters to the logic of determinants may be provided by various sub-systems, such as map information (e.g. geographical locations, etc.), network KPIs (e.g. from an Optimization System, etc.), Hetnet Wi-Fi off-loading, and/or BSS/OSS systems.

The intelligent dynamic route determinant engine 202 may also use (and/or also build) historical trends per location and subscriber. For example, the BSS/OSS may house various aspects of customer experience/subscriber network experience preferences/network health index/subscriber network experience index.

Based on the input received from the subscriber, the intelligent dynamic route determinant engine 202 may calculate and recommend uninterrupted routes based on interface inputs from various sub-systems. The intelligent dynamic route determinant engine 202 may also recalculate and send automatic alerts based on changes of sub-system information (e.g. network disruption/resumptions, etc.).

Various sub-systems may interface with the intelligent dynamic route determinant engine 202. For example, the intelligent dynamic route determinant engine 202 may interface with the RF optimization system 210 that provides RF measurements to calculate a network health index and coverage per location and subscriber events to calculate subscriber network experience indexes per subscriber and location.

The intelligent dynamic route determinant engine 202 may also interface with the probe/DPI 212, which may supply information per application (e.g. VOIP, video conference, Skype, etc.), and KPIs per location and subscriber.

The intelligent dynamic route determinant engine 202 may also interface with the map system 206, which may add geo location information and/or a map layer. The intelligent dynamic route determinant engine 202 may interface with the BSS/OSS 208, which may provide subscriber information, such as QoS, subscriptions, customer type (e.g. enterprise, VIP, etc.), customer preferences, etc.

The intelligent dynamic route determinant engine 202 may also interface with the Hetnet offloading system 204, which may offer alternatives to cellular networks for stopping points along the route.

The intelligent dynamic route determinant engine 202 may also have access to an Enterprise Product Catalog (EPC), which is part of the BSS/OSS 208. The EPC which may define different plans and offers based on service offerings, region coverage (e.g. local, roaming), types of service, and customer type (e.g. retail/SMB, etc.). The EPC may also help build discount and allowances and bundling offers (linked to existing service plans, etc.). The EPC describes the product offering that a customer will enroll for this service.

The intelligent dynamic route determinant engine 202 may also have access to one or more of a CRM, Proactive Care, or Self-Service systems, which are part of the BSS/OSS 208. These systems may provide information, such as, customer information, type of service information, subscriber preferences, history of travel (e.g. which may be optional based on the preference of the privacy indicated by subscriber), most visited places, reports and statistics, and/or history of travel and business information based user defined reports. Alerts are pushed in real-time to the mobile devices 214.

The intelligent dynamic route determinant engine 202 may also have access to a self-service application and portal. The self-service application may provide information such as service registration, and service query and usage, etc.

As an example implementation of the system 200, from a service flow perspective, a user may register for an offer/plan with a communications service provider (CSP). The user may log into the navigational application or self-service portal associated with the intelligent dynamic route determinant engine 202. The user may then input a start (e.g. which may have a default of the current location) and an end point. The user may also select a mode of transport and a type of service (e.g. voice, data, SMS, conference, etc.).

The user may also input application level QoS information. For example, the user may indicate which application(s) the user is interested in using during the travel (e.g. video conference, online streaming, HDTV, etc.). The system 200 may calculate the required service parameters (e.g. bandwidth, delay, etc.) and take into account these parameters during the route calculation. The user may also indicate a duration of the session and a type of connectivity required (e.g. premium, very high, high, etc.).

Based on dynamic routing heuristic logic, taking inputs from various inputs sources, history trends and route determinant algorithms, the intelligent dynamic route determinant engine 202 may suggest the best calculated route for the user. The intelligent dynamic route determinant engine 202 may also provide dynamic alerts, alternative routes, and/or recommendations to the user, based on the input data and real time data.

The intelligent dynamic route determinant engine 202 may continuously interface with various sub-systems, as shown in FIG. 2. Information may also be stored as part of a repository of historical trends per location and subscriber. The intelligent dynamic route determinant engine 202 may also recalculate and send automatic alerts based on a change of sub-system info (network disruption/resumptions, etc.). Further, for routes that include intermediate stops, the intelligent dynamic route determinant engine 202 may suggest Wi-Fi Offloading options or alternative suggestions, such as to stay in a current location, upgrade service, and provide on-route alerts and rerouting options. The system 200 may also function to provide standard and customized reports and business information based on usage pattern, and preferences, etc. These alerts may be constantly pushed to one or more of the mobile devices 214, until the end of the journey.

Figure 3:
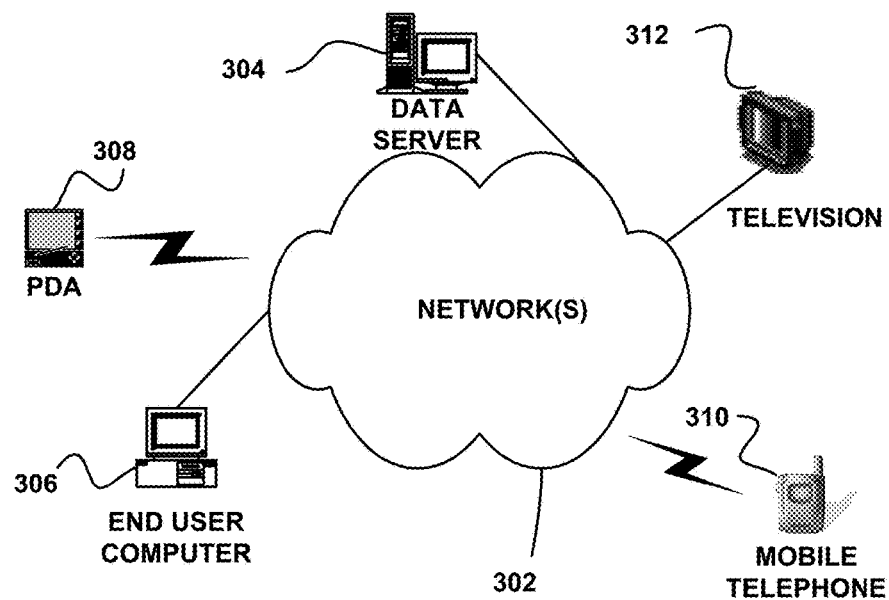
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
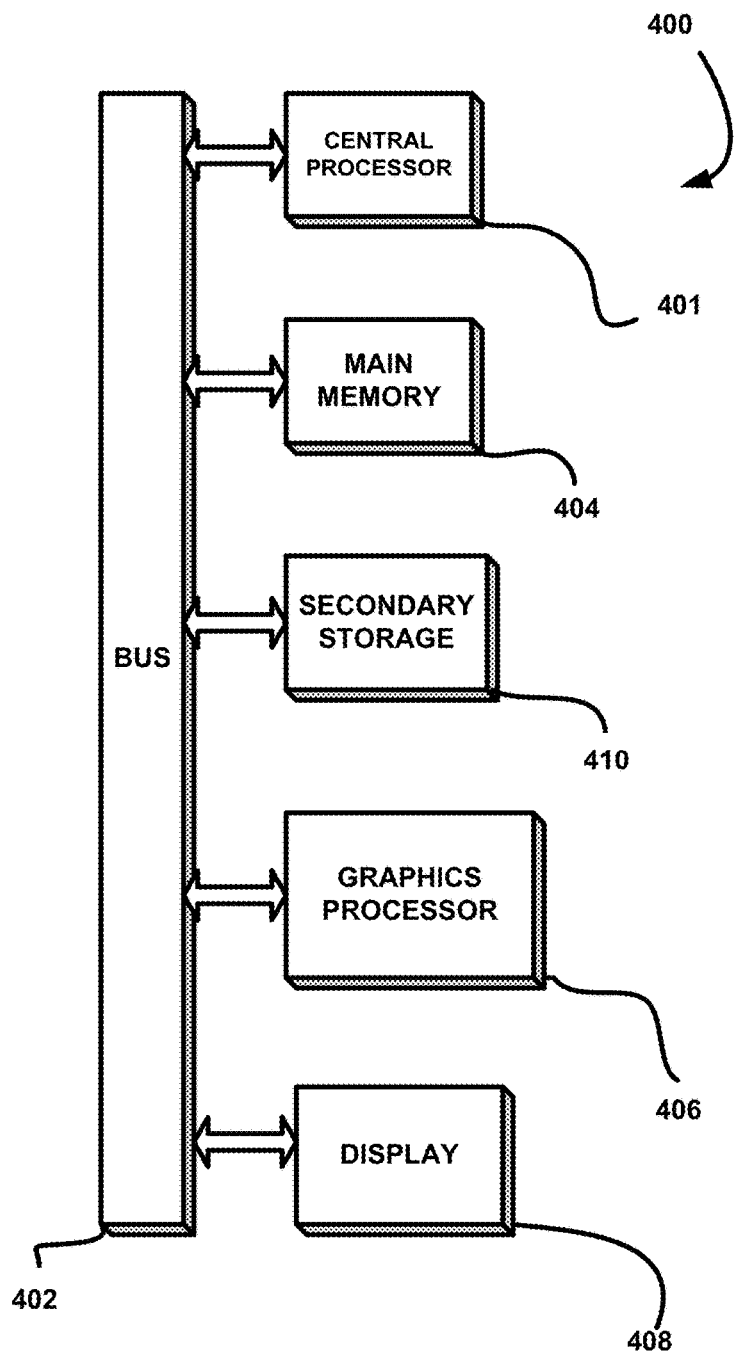
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    receiving at least one input parameter from a mobile device of a customer that is associated with at least one communication network, the at least one input parameter corresponding to a navigational task to be performed utilizing the mobile device and including a requested service type;
    identifying a starting point associated with the navigational task;
    identifying an ending point associated with the navigational task;
    determining, from a quality of service (QoS) subscription of the customer with a communication service provider, QoS requirements for the requested service type;
    determining at least one route from the starting point to the ending point that satisfies the QoS requirements for the requested service type, based at least in part on a current service continuity associated with the mobile device, a historical service continuity associated with the mobile device, and the at least one input parameter, the current service continuity being determined utilizing current radio frequency (RF) network health information and current probe-based key performance indicator (KPI) information and the historical service continuity being determined utilizing historical RF network health information and historical probe-based KPI information;
    presenting the at least one route as at least one route option associated with the navigational task utilizing the mobile device;
    receiving additional current service continuity information associated with the mobile device;
    identifying at least one alternative route to the at least one route based on the additional current service continuity information associated with the mobile device; and
    presenting an indication of the at least one alternative route utilizing the mobile device.

2. The method of claim 1, wherein the navigational task is associated with at least one of a vehicle navigation, a walking navigation, a biking navigation, a boating navigation, or a public transit navigation.

3. The method of claim 1, wherein the mobile device associated with the at least one communication network includes at least one of a mobile phone, a handheld navigational unit, a vehicle navigation unit, a watch, or a computer.

4. The method of claim 1, wherein the at least one input parameter includes the starting point.

5. The method of claim 1, wherein the at least one input parameter includes the ending point.

6. The method of claim 1, wherein the requested service type includes one or more of a voice service, a data service, or a messaging service.

7. The method of claim 1, wherein the at least one input parameter includes a desired interim stop between the starting point and the ending point.

8. The method of claim 1, wherein the at least one input parameter includes at least one mode of transport.

9. The method of claim 1, wherein the at least one input parameter includes at least one network preference.

10. The method of claim 1, wherein the at least one input parameter includes a map or navigational input from at least one application associated with the mobile device or another device.

11. The method of claim 1, wherein the at least one input parameter is associated with a Wi-Fi offloading option.

12. The method of claim 1, wherein presenting the at least one route as the at least one route option associated with the navigational task utilizing the mobile device includes suggesting an initial best route.

13. The method of claim 1, wherein identifying the at least one alternative route to the at least one route based on the additional current service continuity information associated with the mobile device includes identifying the alternative routes based on real-time analytics, the real-time analytics including one or more of radio frequency (RF) network health index information and probe-based key performance indicators (KPIs).

14. The method of claim 1, further comprising providing alerts for disruptions in the service continuity of the mobile device.

15. The method of claim 1, further comprising providing alerts for anticipated disruptions in the service continuity of the mobile device based on a current route associated with the mobile device.

16. The method of claim 1, wherein the at least one input parameter is associated with customer information and network experience preference information.

17. The method of claim 1, wherein the input parameter further includes a duration of a session associated with the requested service type.

18. The method of claim 1, wherein determining at least one route from the starting point to the ending point includes determining a plurality of routes from the starting point to the ending point each associated with a different service choice for uninterrupted service during a trip from the starting point to the ending point, and wherein presenting the at least one route as at least one route option includes presenting the plurality of routes as different route options for selection by the customer.

19. A computer program product embodied on a non-transitory computer readable medium, comprising:
    computer code for receiving at least one input parameter from a mobile device of a customer that is associated with at least one communication network, the at least one input parameter corresponding to a navigational task to be performed utilizing the mobile device and including a requested service type;
    computer code for identifying a starting point associated with the navigational task;

computer code for identifying an ending point associated with the navigational task;
computer code for determining, from a quality of service (QoS) subscription of the customer with a communication service provider, QoS requirements for the requested service type;
computer code for determining at least one route from the starting point to the ending point that satisfies the QoS requirements for the requested service type, based at least in part on a current service continuity associated with the mobile device, a historical service continuity associated with the mobile device, and the at least one input parameter, the current service continuity being determined utilizing current radio frequency (RF) network health information and current probe-based key performance indicator (KPI) information and the historical service continuity being determined utilizing historical RF network health information and historical probe-based KPI information;
computer code for presenting the at least one route as at least one route option associated with the navigational task utilizing the mobile device;
computer code for receiving additional current service continuity information associated with the mobile device;
computer code for identifying at least one alternative route to the at least one route based on the additional current service continuity information associated with the mobile device; and
computer code for presenting an indication of the at least one alternative route utilizing the mobile device.

20. A system comprising:
a memory system; and
one or more processing cores coupled to the memory system and that are each configured to:
receive at least one input parameter from a mobile device of a customer that is associated with at least one communication network, the at least one input parameter corresponding to a navigational task to be performed utilizing the mobile device and including a requested service type;
identify a starting point associated with the navigational task;
identify an ending point associated with the navigational task;
determine, from a quality of service (QoS) subscription of the customer with a communication service provider, QoS requirements for the requested service type;
determine at least one route from the starting point to the ending point that satisfies the QoS requirements for the requested service type, based at least in part on a current service continuity associated with the mobile device, a historical service continuity associated with the mobile device, and the at least one input parameter, the current service continuity being determined utilizing current radio frequency (RF) network health information and current probe-based key performance indicator (KPI) information and the historical service continuity being determined utilizing historical RF network health information and historical probe-based KPI information;
present the at least one route as at least one route option associated with the navigational task utilizing the mobile device;
receive additional current service continuity information associated with the mobile device;
identify at least one alternative route to the at least one route based on the additional current service continuity information associated with the mobile device; and
present an indication of the at least one alternative route utilizing the mobile device.

* * * * *